No. 813,989. PATENTED FEB. 27, 1906.
V. L. RICE.
ANTIFRICTION BEARING.
APPLICATION FILED NOV. 3, 1904.

2 SHEETS—SHEET 1.

Witnesses.
L. C. Hurlburt.
H. L. Trimble.

Inventor.
Vietto L. Rice
by Chas. W. Rules
his attorney

No. 813,989. PATENTED FEB. 27, 1906.
V. L. RICE.
ANTIFRICTION BEARING.
APPLICATION FILED NOV. 3, 1904.
2 SHEETS—SHEET 2.
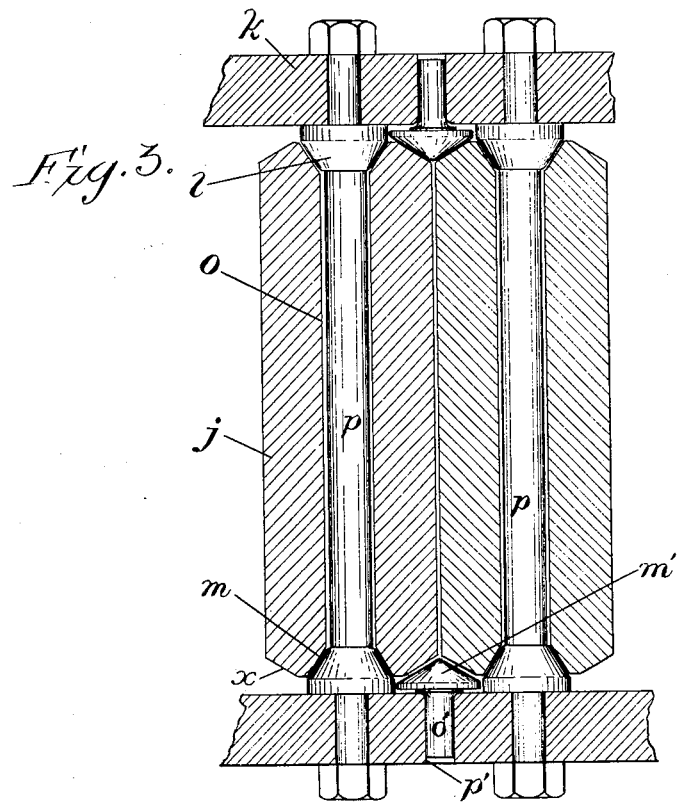
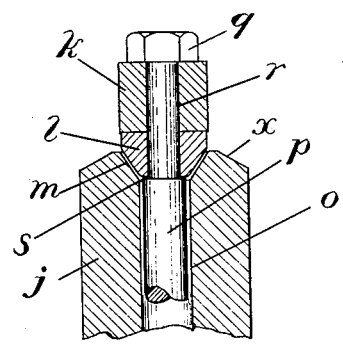
Witnesses.
L. C. Hurlburt
H. L. Trimble
Inventor.
Vietts L. Rice
by Chas Rickes
his attorney

UNITED STATES PATENT OFFICE.

VIETTS L. RICE, OF NEW YORK, N. Y.

ANTIFRICTION-BEARING.

No. 813,989.  Specification of Letters Patent.  Patented Feb. 27, 1906.

Application filed November 3, 1904. Serial No. 231,223.

*To all whom it may concern:*

Be it known that I, VIETTS LYSANDER RICE, a citizen of the United States, and a resident of the city of New York, in the county and State of New York, now temporarily residing at the city of Toronto, in the county of York and Province of Ontario, Canada, have invented certain new and useful Improvements in Antifriction-Bearings; and I hereby declare that the following is a full, clear, and exact description of the same.

This invention relates, primarily, to an antifriction-bearing comprising an annular set of bearing-rollers having central longitudinal bores with conical recesses at the ends thereof maintained in their annular formation by cage-rings tied together by bolts of less diameter than and passing through the longitudinal bores of the bearing-rollers, antifriction-cones on the inner sides of the annular cage-rings to enter the conical recesses in the bearing-rollers, said cones being so positioned that the bearing-rollers may move for a limited distance in both directions between them, two concentric bearing parts contacting with the bearing-rollers, unoccupied annular recesses at the ends of the bearing parts whereby the length of their operative surfaces is less than the length of the operative surfaces of the bearing-rollers, and limiting means at the ends of the bearing parts between which the bearing-rollers may move back and forth across said recesses.

A further feature of the invention is to hold the bearing-rollers evenly spaced under all conditions of load by providing the cage-rings with spacing-cones to contact the ends of the bearing-rollers, and thus equalize the load upon them.

For a full understanding of the invention reference is to be had to the following description and to the accompanying drawings, in which—

Figure 1:
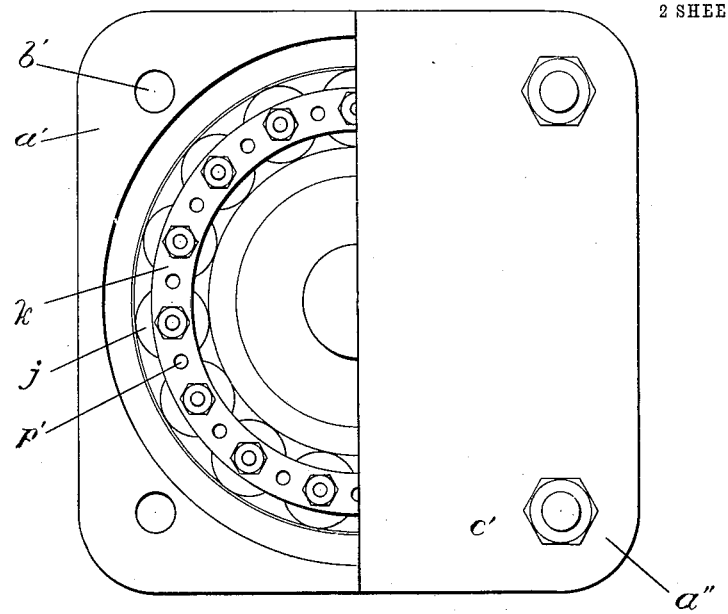
Figure 2:
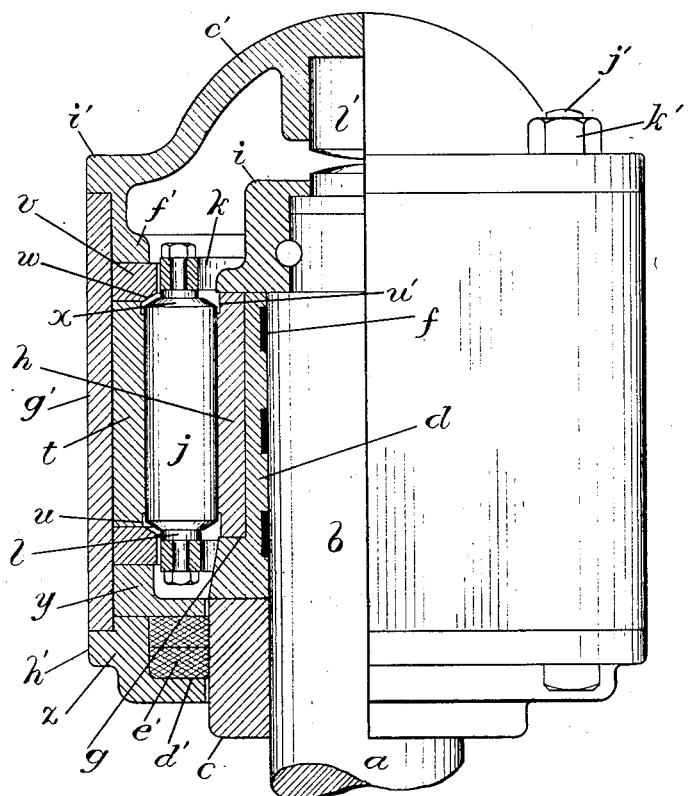

Figure 1 is an end elevation of the journal-box with the outer end cover partly broken away. Fig. 2 is a side elevation of the same, partly in section, showing the antifriction-bearing and internal construction of the component parts of the journal-box. Fig. 3 is a sectional view of two bearing-rollers, showing a portion of the cage-rings, antifriction-cones, and spacing-cones. Fig. 4 is a sectional view through one of the bearing-rollers, tie-bolt, antifriction-cones, and a portion of the cage-rings.

Like letters of reference refer to like parts throughout the specification and drawings.

Shrunk on the axle $a$ at the inner end of the journal $b$ is a fixed collar $c$, and loosely mounted on the journal $b$ between the fixed collar $c$ and its outer end is a close-fitting emergency-sleeve $d$, having in its inner face a series of recesses for the reception of a lubricant $f$. Near the inner end of the emergency-sleeve $d$ is an annular shoulder $g$ to contact with the inner end of the journal bearing part $h$, and removably fitted on the axle $a$ at the outer end of the journal $b$ is a collar $i$ to engage the outer end of the emergency-sleeve $d$ and journal bearing part $h$ and revolubly hold the emergency-sleeve $d$ in position upon the journal between itself and the fixed collar $c$, and the journal bearing part $h$ in position between itself and the annular shoulder $g$ of the emergency-sleeve. Encircling the journal bearing part $h$ is a set of antifriction bearing-rollers $j$, retained between two cage-rings $k$. Attached to the inner faces of the cage-rings are a series of antifriction-cones $l$ to enter the concaved ends $m$ of the antifriction bearing-rollers $j$, there being sufficient space between the antifriction-cones and the contacting faces of the concaved ends to allow of a limited longitudinal movement of the antifriction bearing-rollers between the cage-rings to prevent the bearing-rollers binding against the antifriction-cones and to enable the lubricant to enter the concaved ends as the bearing-rollers move longitudinally on the antifriction-cones. Each antifriction-roller has a central longitudinal bore $o$ for its respective tie-bolt $p$, the bore $o$ being of slightly greater diameter than the bolt, so that there will be no contact between them. The ends of each bolt $p$ are of less diameter than the body portion and pass centrally through the antifriction-cones $l$ and through the cage-rings $k$, on the outer faces of which they are fitted with lock-nuts $q$. The tie-bolts $p$ for each set of bearing-rollers are all of the same length, and the bolt-apertures $r$ in the cage-rings $k$ are evenly spaced, so that when the parts are assembled the tie-bolts will hold the cage-rings properly spaced and each pair of antifriction-cones properly alined to maintain the correct alinement of the bearing-rollers, the longitudinal movement of the antifriction-cones upon the tie-bolts being prevented by their contact with the cage-rings and with the shoulders $s$ at the junctions of the reduced ends with the body portion of the bolts.

Encircling the antifriction bearing-rollers $j$ is the journal-box bearing part $t$, having at each end of its bearing-surface unoccupied annular recesses $u$, corresponding with similar recesses $u'$ at the ends of the bearing-surface of the journal bearing part $h$ to render the operative surfaces of the bearing parts less than the operative surfaces of the antifriction bearing-rollers, so that there will be no contact of the ends of the bearing-rollers with the bearing-surfaces. At the ends of the journal-box bearing part $t$ are arresting-rings $v$, having beveled faces $w$ to contact the beveled ends $x$ of the bearing-rollers during their longitudinal movement upon the journal, the distance between the beveled faces of the arresting-rings being greater than the extreme length of the bearing-rollers, so that the set of bearing-rollers may creep longitudinally in either direction across said recesses until their beveled ends come into contact with the beveled faces of the arresting-rings, which act as limitations for the longitudinal movement of the bearing-rollers. By permitting the bearing-rollers to move longitudinally between the arresting-rings the possibility of the bearing-rollers binding against them is obviated, and the free rotation of the bearing-rollers collectively with the cage-rings around the journal is insured, as well as the free rotation of each bearing-roller between its antifriction-cones. At the inner end of the journal is a retaining-ring $y$, abutting against the inner arresting-ring $v$ to hold the inner arresting-ring in position against the journal-box bearing part $t$, and contacting the retaining-ring $y$ is the inner end cover $z$, having flanges $a'$ with bolt-holes $b'$ alining with similar bolt-holes in the flanges $a''$ of the outer end cover $c'$, and formed in the inner face of the inner end cover $z$ is a chamber $d'$ for the reception of the dust-excluding washers $e'$, held within the chamber by the retaining-ring and the shell of the inner end cover. The inner face of the outer end cover $c'$ has an internal annular flange $f'$ to engage the outer face of the outer arresting-ring $v$ for the purpose of holding the journal-box bearing part $t$ properly positioned to contact with the antifriction bearing-rollers. Inclosing the journal-box bearing part $t$ and the arresting and retaining rings and a portion of the outer surfaces of the inner and outer end covers is the body portion $q'$ of the journal-box, and projecting from the outer surfaces of the inner and outer end covers are flanges $h'$ and $i'$, respectively, to contact the ends of the body portion $q'$ and securely hold it in position as a component part of the journal-box. When the parts of the journal-box are assembled, the bolt-holes $b'$ in the outer and inner end covers are alined, and passing through these bolt-holes are fastening-bolts $j'$, fitted with nuts $k'$ to engage the outer faces of the flanges $a'$ $a''$ and lock the inner and outer end covers against the ends of the body portion $q'$ to rigidly hold the component parts of the antifriction-bearing in their relative positions. In the center of the inner face of the outer end cover is an end-thrust member consisting of an antifriction-block $l'$, opposed to the end of the shaft or axle $a$ to receive the impact of the axle during its end-thrust movement for the purpose of relieving the arresting-rings and bearing-rollers of the wear which would otherwise be occasioned.

To equalize the load upon the bearing-rollers, the cage-rings intermediate the bearing-cones are provided with spacing-cones $m'$ to contact the beveled faces of the bearing-rollers, so that the load upon any one of the bearing-rollers may be evenly distributed to the remaining bearing-rollers, and to maintain these spacing-cones in position each spacing-cone has projecting from its outer face a stud $o'$ to enter a corresponding aperture $p'$ in the adjacent face of its respective cage-ring.

Having thus fully described my invention, what I claim as new, and desire to secure by Letters Patent, is—

1. An antifriction-bearing comprising an annular set of bearing-rollers, two concentric bearing parts contacting with the bearing-rollers, said bearing parts having unoccupied annular recesses at their ends, whereby the length of the operative surfaces of said bearing parts is less than the length of the operative surfaces of the bearing-rollers, and limiting means at the ends of the bearing parts, between which the bearing-rollers may move back and forth across said recesses.

2. An antifriction-bearing comprising an annular set of bearing-rollers, having central longitudinal bores with conical recesses at the ends thereof, cage-rings at the ends of the bearing-rollers, bolts passing through the longitudinal bores of the bearing-rollers to fasten the cage-rings together, antifriction-cones on the bolts on the inner sides of the cage-rings to enter the conical recesses of the bearing-rollers and between which the bearing-rollers may individually move back and forth, two concentric bearing parts contacting with bearing-rollers, said bearing parts having unoccupied annular recesses at their ends whereby the length of the operative surfaces of said bearing parts is less than the operative surfaces of the bearing-rollers, and limiting means at the ends of the bearing parts between which the bearing-rollers may move back and forth across said recesses.

3. An antifriction-bearing comprising an annular set of bearing-rollers, having beveled ends and central longitudinal bores with conical recesses at the ends thereof, cage-rings at the ends of the bearing-rollers, bolts passing through the bores of the bearing-rollers to fasten the cage-rings together, antifriction-cones on the bolts on the inner sides of the cage-rings to enter the conical recesses of the bearing-rollers and between which the bearing-rollers may individually move back and forth, two concentric bearing parts contacting with the bearing-rollers, said bearing parts having unoccupied annular recesses at their ends whereby the length of the operative surfaces of said bearing parts is less than the length of the operative surfaces of the bearing-rollers, and arresting-rings at the ends of the bearing parts having beveled faces to contact with the beveled ends of the bearing-rollers, and between which the bearing-rollers may move back and forth across said recesses.

4. An antifriction-bearing comprising two concentric bearing parts, bearing-rollers having beveled ends interposed between the bearing parts, said bearing-rollers having central conical recesses in their ends, cage-rings at the ends of the bearing-rollers, antifriction-cones connected to the cage-rings to enter said conical recesses, and spacing-cones connected to the cage-rings intermediate the antifriction-cones to contact with the beveled ends of the bearing-rollers.

5. An antifriction-bearing comprising an annular set of bearing-rollers having beveled ends, cage-rings for the bearing-rollers and spacing-cones connected to the cage-rings to engage with the beveled ends of the bearing-rollers.

6. An antifriction-bearing comprising an annular set of bearing-rollers having beveled ends, concentric annular bearing parts contacting with the bearing-rollers, cage-rings to maintain the annular formation of the bearing-rollers, spacing-cones connected to the cage-rings to contact with the beveled ends of the bearing-rollers, annular arresting-rings at the ends of the bearing parts having beveled faces to engage with the beveled ends of the bearing-rollers, and between which the bearing-rollers are collectively movable back and forth.

7. An antifriction-bearing comprising an annular set of bearing-rollers having beveled ends and central longitudinal bores with conical recesses at the ends thereof, cage-rings, bolts passing through the bores of the bearing-rollers to tie the cage-rings together, antifriction-cones on the bolts to enter the conical recesses of the bearing-rollers and so positioned as to allow the bearing-rollers to individually move back and forth between them, spacing-cones connected to the cage-rings to contact the beveled ends of the bearing-rollers, annular bearing parts contacting with the bearing-rollers, and arresting-rings at the ends of the bearing parts having beveled faces to contact with the beveled ends of the bearing-rollers and between which the bearing-rollers are collectively movable back and forth.

Toronto, October 26, 1904.

VIETTS L. RICE.

In presence of—
C. H. RICHES,
H. L. TRIMBLE.